(12) United States Patent
Wu

(10) Patent No.: US 8,702,325 B2
(45) Date of Patent: Apr. 22, 2014

(54) CONNECTOR ASSEMBLY WITH ELECTRICAL AND OPTICAL TRANSMITTING

(75) Inventor: Jerry Wu, Irvine, CA (US)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 264 days.

(21) Appl. No.: 13/231,985

(22) Filed: Sep. 14, 2011

(65) Prior Publication Data

US 2012/0063726 A1 Mar. 15, 2012

(30) Foreign Application Priority Data

Sep. 15, 2010 (CN) .......................... 2010 2 0529962

(51) Int. Cl.
*G02B 6/36* (2006.01)

(52) U.S. Cl.
USPC .................... 385/93; 385/88; 385/89; 385/92

(58) Field of Classification Search
USPC ............................................................ 385/93
See application file for complete search history.

(56) References Cited

U.S. PATENT DOCUMENTS

| | | | | |
|---|---|---|---|---|
| 6,558,045 B2 * | 5/2003 | Yamaguchi | | 385/75 |
| 7,572,071 B1 * | 8/2009 | Wu | | 385/94 |
| 7,798,726 B2 * | 9/2010 | Sabo | | 385/88 |
| 7,872,873 B2 * | 1/2011 | Hiew et al. | | 361/737 |
| 8,118,497 B2 * | 2/2012 | Yi | | 385/93 |
| 8,398,314 B2 * | 3/2013 | Ko et al. | | 385/93 |
| 8,403,568 B2 * | 3/2013 | Wang et al. | | 385/76 |
| 2010/0046891 A1 * | 2/2010 | Sabo | | 385/74 |
| 2010/0080519 A1 * | 4/2010 | Ko et al. | | 385/93 |
| 2010/0124395 A1 * | 5/2010 | Lin et al. | | 385/76 |
| 2010/0226612 A1 * | 9/2010 | Sedio et al. | | 385/93 |
| 2010/0290743 A1 * | 11/2010 | Liao et al. | | 385/75 |
| 2010/0290745 A1 * | 11/2010 | Liao et al. | | 385/90 |
| 2010/0322570 A1 * | 12/2010 | Zheng et al. | | 385/93 |
| 2011/0229094 A1 * | 9/2011 | Isenhour et al. | | 385/92 |
| 2011/0262082 A1 * | 10/2011 | Sakurai et al. | | 385/89 |
| 2011/0305417 A1 * | 12/2011 | Wang et al. | | 385/39 |
| 2012/0020629 A1 * | 1/2012 | Shiratori et al. | | 385/93 |
| 2013/0129284 A1 * | 5/2013 | Torikai et al. | | 385/75 |

* cited by examiner

*Primary Examiner* — Rhonda Peace
(74) *Attorney, Agent, or Firm* — Wei Te Chung; Ming Chieh Chang

(57) ABSTRACT

A connector assembly includes a plug connector (1000) electrically and optically connecting with a receptacle connector (2000). The plug connector (1000) includes a first insulative housing; a terminal module supported by the first insulative housing, the terminal module including a plurality of terminals combined with an insulator; at least one optical member (8) mounted to the first insulative housing; the optical member and the terminal module arranged at opposite sides of the first insulative housing. The receptacle connector (2000) includes a second insulative housing; a contact module supported by the second insulative housing, the contact module including a plurality of contacts combined with a contact seat; at least one optical module (208) mounted to the second insulative housing; and wherein the contact module is adapted for mating with the terminal module transmitting electrical signal; wherein the optical member is adapted for mating with the optical module transmitting optical signal.

17 Claims, 8 Drawing Sheets

CONNECTOR ASSEMBLY WITH ELECTRICAL AND OPTICAL TRANSMITTING

FIELD OF THE INVENTION

The present invention generally relates to a connector assembly, and more particularly to a connector assembly for electrical and optical transmitting.

DESCRIPTION OF PRIOR ART

With development of interconnection technique, a wide range of electrical connector assemblies in accordance with USB, SATA, HDMI, SAS and Displayport transmitting protocol have been widely applied in different kinds of electronic devices. The aforementioned connector assemblies depend on metallic terminals and copper wires to achieve electrical signal transmitting. However, transmitting speed is limited via electrical signal transmitting. In other aspect, with transmitting speed increasing, a structure of the connector assembly becomes complex, and a total dimension of the cable assembly is increasing.

CN Pub. Pat. No. 101345358 published on Jan. 14, 2009 discloses an optical USB connector assembly which has a fiber device added to a USB connector assembly. The connector assembly includes a USB connector with a fiber device for transmitting electrical and optical signal. The fiber device has a number of fibers connected with lenses directly embedded in a housing of the USB connector. However, as the lenses are relative small and discrete from each other and not easily to be assembled to the USB connector or demounted from the USB connector.

Hence, an improved connector assembly is highly desired to overcome the aforementioned problems.

SUMMARY OF THE INVENTION

Accordingly, an object of the present invention is to provide a lower profile and easily manufactured connector assembly for electrical and optical transmitting.

In order to achieve the object set forth, a connector assembly in accordance with the present invention comprises a plug connector electrically and optically connecting with a receptacle connector. The plug connector comprises a first insulative housing; a terminal module supported by the first insulative housing, the terminal module including a plurality of terminals combined with an insulator; at least one optical member mounted to the first insulative housing; the optical member and the terminal module arranged at opposite sides of the first insulative housing. The receptacle connector comprises a second insulative housing; a contact module supported by the second insulative housing, the contact module including a plurality of contacts combined with a contact seat; at least one optical module mounted to the second insulative housing; and wherein the contact module is adapted for mating with the terminal module transmitting electrical signal; wherein the optical member is adapted for mating with the optical module transmitting optical signal.

Other objects, advantages and novel features of the invention will become more apparent from the following detailed description when taken in conjunction with the accompanying drawings.

DETAILED DESCRIPTION OF PREFERRED EMBODIMENTS

Reference will now be made in detail to the preferred embodiment of the present invention.

Figure 7:
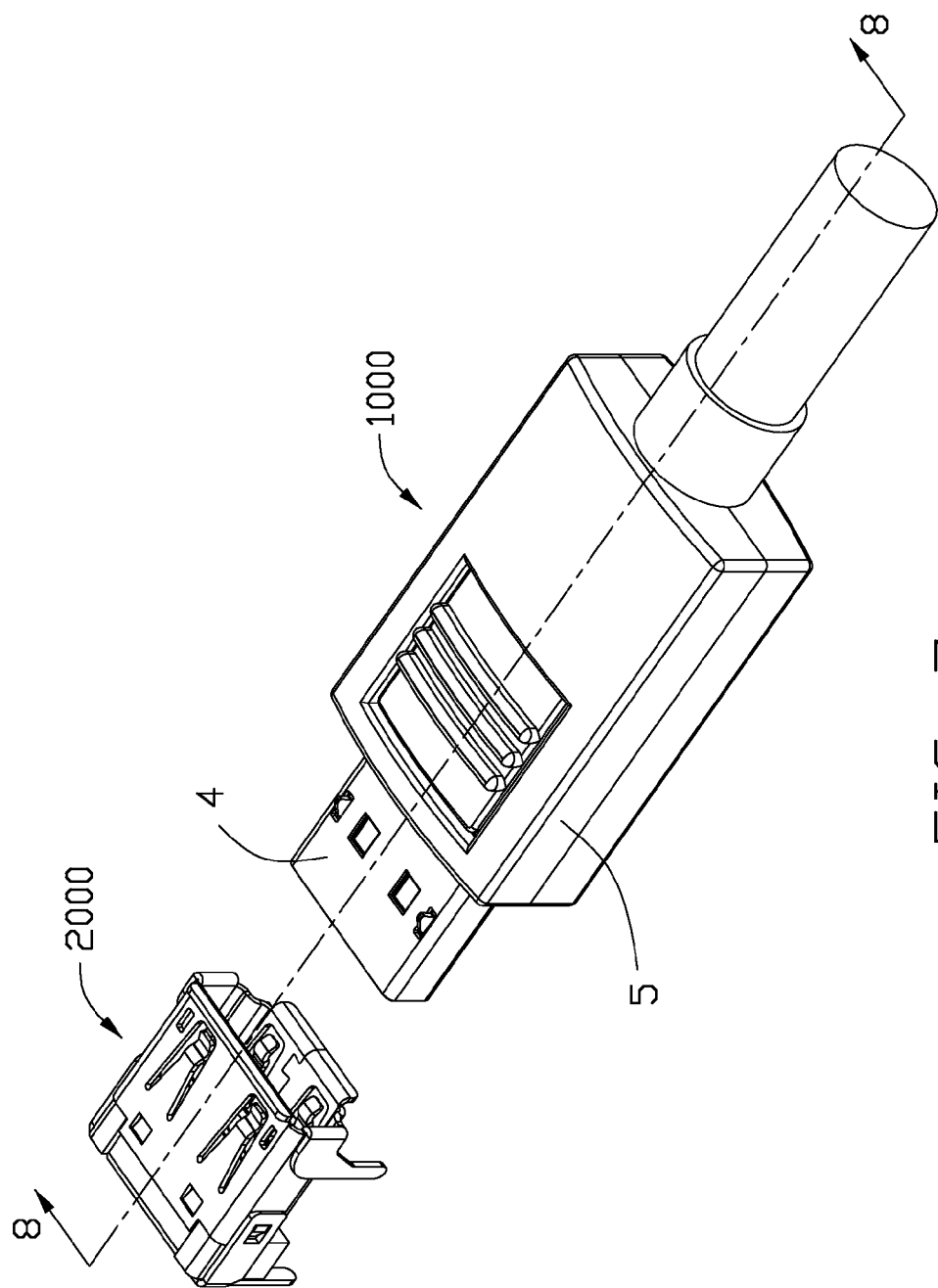
FIG. 7 illustrates the plug connector and the receptacle connector in unmated state.
Figure 8:
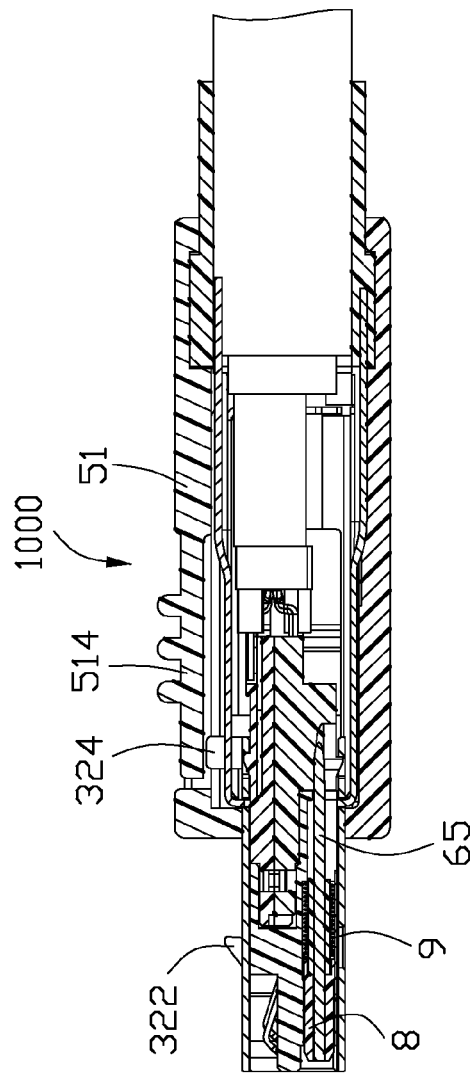
FIG. 8 is a cross-section view taken along line 8-8 of FIG. 7.
Figure 8:
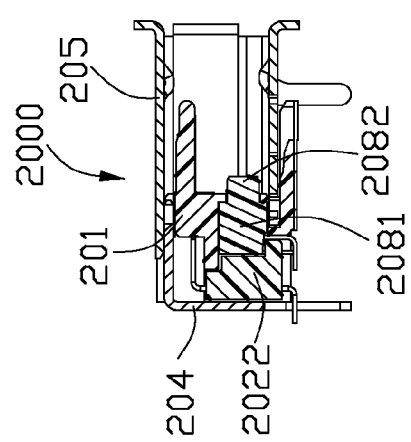

Referring to FIGS. 7-8, a connector assembly for electrical and optical signal transmitting comprises a plug connector 1000 and a receptacle connector 2000.

Figure 1:
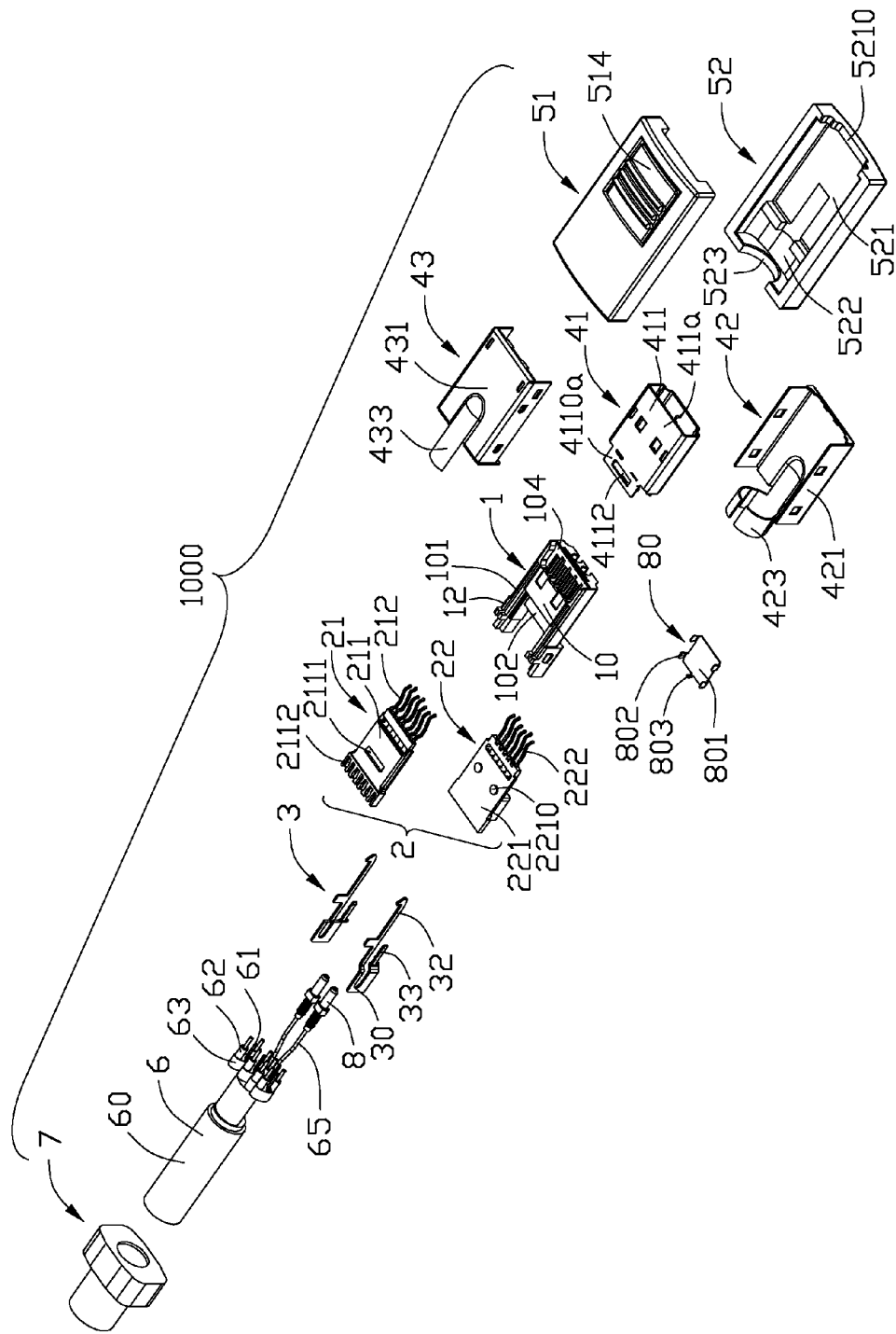
FIG. 1 is an exploded, perspective view of a plug connector of a connector assembly in accordance with the present invention.
Figure 2:
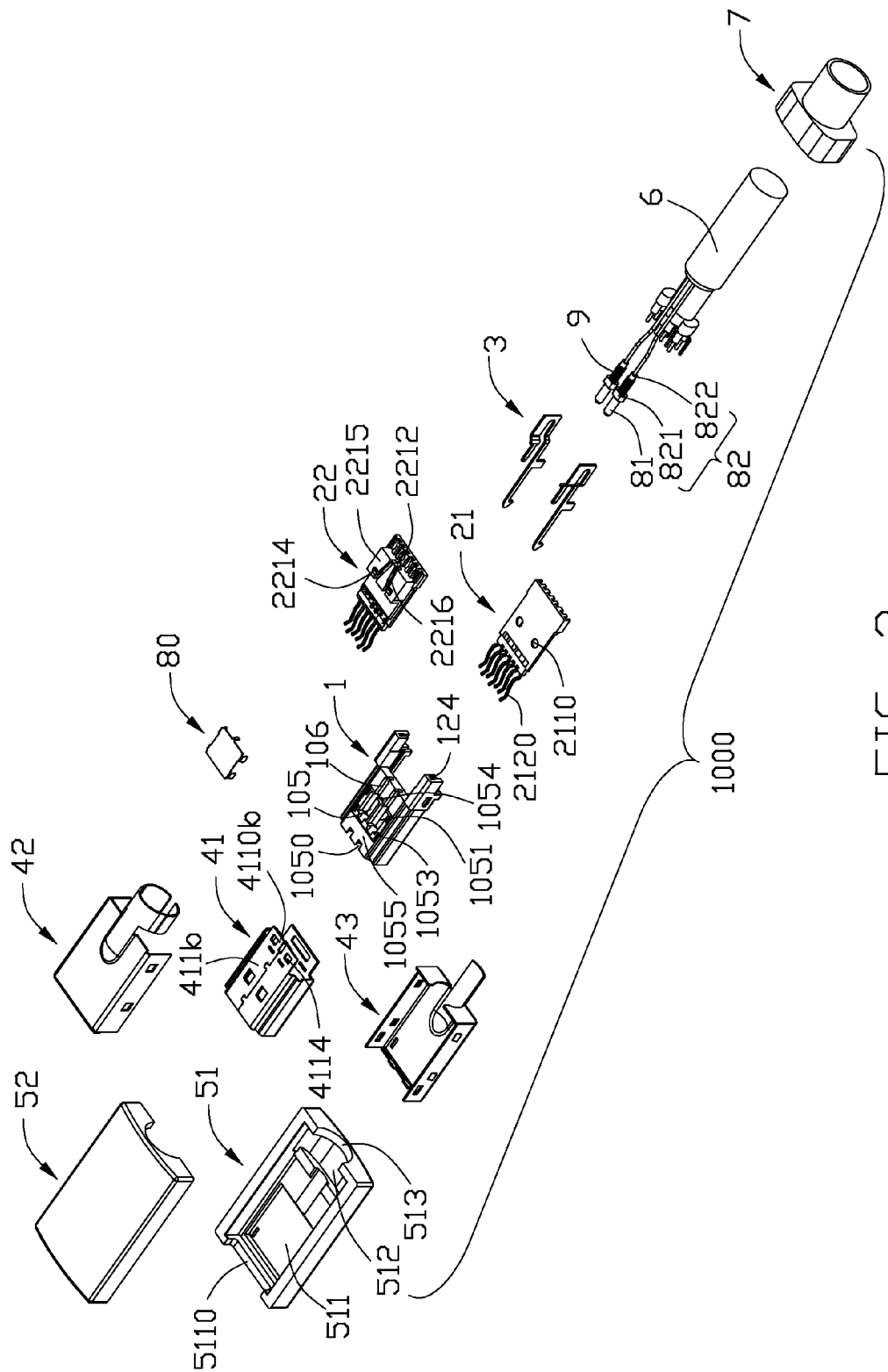
FIG. 2 is similar to FIG. 1, but viewed from another aspect.
Figure 3:
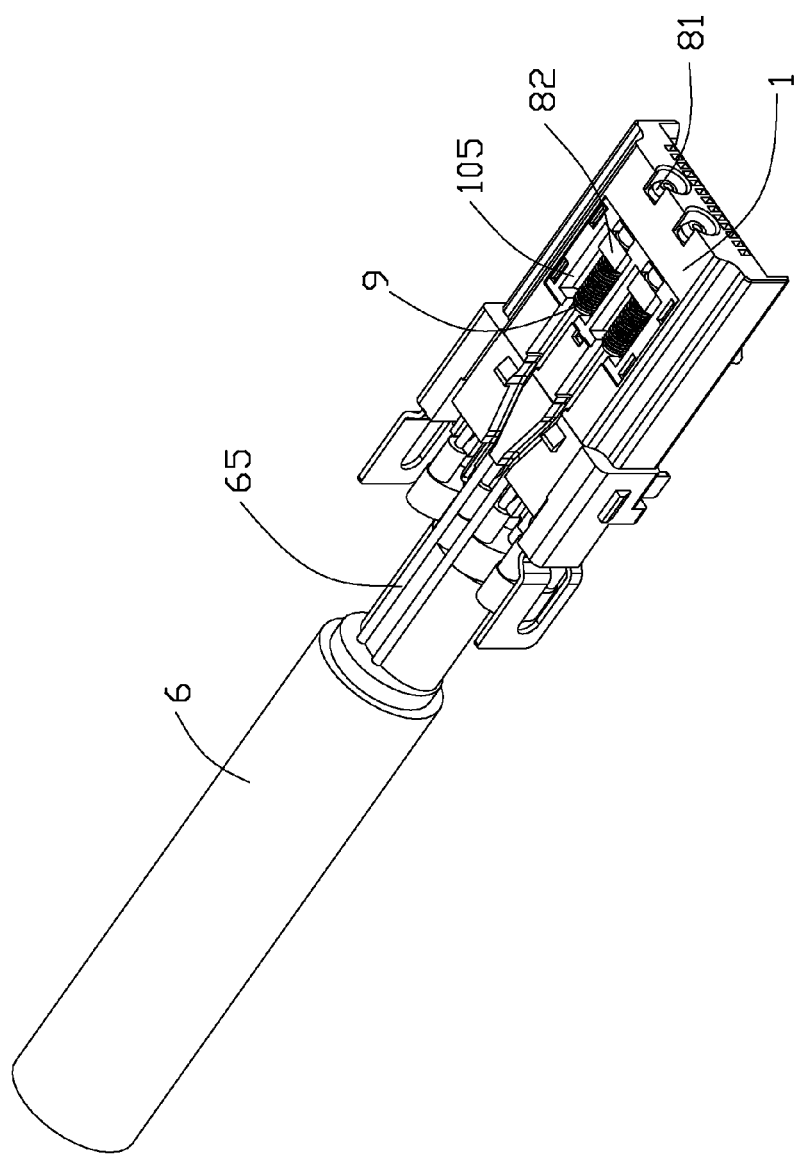
FIG. 3 is a partially assembled view of the plug connector.

Referring to FIGS. 1-3, the plug connector 1000 comprises a first insulative housing 1, a terminal module 2 supported by the first insulative housing 1, two latching members 3 mounted to the first insulative housing 1, a first metallic shell shielding the first insulative housing 1, an external cover 5, a cable 6, a strain relief 7 and two optical members 8.

The first insulative housing 1 includes a main portion 10 and two mounting arms 12 extending rearwardly from lateral sides of the main portion 10. A receiving space 102 is recessed forwardly from a middle segment of a rear edge of the main portion 10. A cavity 104 is recessed downwardly from a front segment of a top side of the main portion 10 and further communicates with the receiving space 102. A slot 101 is defined in each mounting arm 12 and partial of main portion 10 in front of the mounting arm 12. A positioning hole 124 is defined in a rear portion of each mounting arm 12. There are two grooves 105 located in a bottom side of the main portion 10. Each groove 105 extends along a front-to-back direction. The groove 105 has a front portion 1050 smaller or narrower than a back portion 1051 thereof. There is a transversal bar 1055 located at a bottom side of and further crossing the front portion 1050. There are two passages 106 are located behind and communicate with the two grooves 105. The passage 106 is narrower than the corresponding groove 105 which is located forwardly. There are four first positioning holes 1053 are separated into two groups and arranged at outer lateral sides of the two grooves 105, respectively. In addition, there is a second positioning hole 1054 located behind the two grooves 105.

The terminal module 2 includes a first terminal module 21 and a second terminal module 22. The first terminal module 21 has an insulator 211 and a number of terminals 212 combined together by insert-molding process. The terminals 212 are divided into signal terminals and grounding terminals configured to be longer than the signal terminals. The terminals 212 have contacting portions 2120 disposed in front of an edge of the insulator 211 and tail portions which are accommodated in terminal slots 2112 defined in a back segment of the insulator 211. Two mounting holes 2110 are defined in a bottom side of the insulator 211 and a protruding portion 2111 are formed on a top side of the insulator 211.

The second terminal module 22 has an insulator 221 and a number of terminals 222 combined together by insert-molding process. The terminals 222 are divided into signal terminals and grounding terminals configured to be longer than the signal terminals. The terminals 222 have contacting portions disposed in front of an edge of the insulator 221 and tail portions which are accommodated in terminal slots 2212 defined in a back segment of the insulator 221. Two mounting posts 2210 are formed on a top side of the insulator 221. There are two protruding portions 2214 formed on a bottom side of the insulator 221. In addition, there is a platform 2215 on the bottom side of the insulator 221 and there are two curved fiber channels 2216 through the platform 2215 along a front-to-back direction.

The first terminal module 21 and the second terminal module 22 are stacked with each other, with the contacting portions merged into one row, while the tail portions separated into two distinct rows along an up-to-down direction. The mounting posts 2210 are inserted into the mounting holes 2110 so as to keep the first terminal module 21 and the second terminal module 22 together. The first terminal module 21 and the second terminal module 22 are assembled to the insulative housing 1, with front segments of the insulators 211, 221 inserted into the receiving space 102.

Each latching member 3 includes a connecting arm 30, a latching arm 32 and a retention arm 33. The latching arm 32 and the retention arm 33 are spaced apart from each other and extend forwardly from the connecting arm 30. Each latching arm 32 has a hook 322 formed at a front end thereof and projects upwardly. There is also a tab 324 formed on a middle of the latching arm 32 and protrudes upwardly. The latching arm 32 and the retention arm 33 are located in a first vertical plane. The connecting arm 30 is located in a second vertical plane disposed outward of the first vertical plane.

The metallic shell has a first shell 41, a second shell 42 and a third shell 43. The first shell 41 includes a first frame 411 to accommodate the main portion 10 therein. The first frame 411 has a top side 411a and a bottom side 411b connected with each other by two lateral sides. There are two through holes (not numbered) located in a front segment of a top side 411a to allow the hooks 322 of the latching arm 32 passing through. A first engaging portion 4110a projects backward from the top side 411a. There is a positioning hole 4112 defined in the first engaging portion 4110a to latch with the protruding portion 2111 of the first terminal module 21. A second engaging portion 4110b projects backward from the bottom side 411b of the first frame 411. There are two positioning holes 4114 defined in the second engaging portion 4110b to latch with the protruding portions 2214 of the second terminal module 22.

The second shell 42 includes a U-shaped main body 421 and a cable holder 423 integrated with the main body 421 and projecting backwardly. The third shell 43 includes an inverted U-shaped main portion 431 and a tail 433 extending rearward. The second shell 42 and the third shell 43 can be combined together along a vertical direction.

The external cover 5 includes an upper cover 51 and a bottom cover 52. The upper cover 51 has a first hollow 511 and a second hollow 512 disposed behind the first hollow 511. A rectangular shaped opening 5110 is located in the front portion of the upper cover 51, and the opening 5110 further communicates with the first hollow 511. A semicircular shaped outlet 513 is defined in the rear portion of the upper cover 51 and communicated with the second hollow 512. A deformable button 514 is integrally formed with the upper cover 51 and floatable along up-to-down direction to enter the first hollow 511 so as to actuate the tab 324 of the latching arm 32.

The bottom cover 52 is similar to the upper cover 51, and also has a first hollow 521 and a second hollow 522 disposed behind the first hollow 521. An opening 5210 is located in the front portion of the bottom cover 52, and the opening 5210 further communicates with the first hollow 521. A semicircular shaped outlet 523 is defined in the rear portion of the bottom cover 52 and communicated with the second hollow 522.

The cable 6 is a hybrid cable and includes a number of wire groups and fibers 65 enclosed in a jacket 60. Each wire group includes a pair of signal wires 62 and a grounding wire 61 associated with the pair of signal wires 62, and a shielding member 63 shrouding the pair of wires 61 and the grounding wire 62. The shielding member 63 is aluminum foil or other similar structure. The strain relief 7 is molded over a front segment of the cable 6 and accommodated in the second hollows 512, 522.

Each optical member 8 includes a cylindrical shape first lens 81 and a ferrule 82 combined with a back part of the first lens 81. The first lens 81 has a narrowed front end. The ferrule 82 has a flange 821 attached to a back part of the first lens 81 and a guiding post 822 projecting backwardly from the flange 821. The fiber 65 extends through the guiding post 822 and further optically coupled with the first lens 81. There is a coil spring 9 associated with the guiding post 822 and against the flange 821, with a back free end of the guiding post 822 backwardly extending beyond the coil spring 9. One of the two optical members 8 transmits optical signal, and the other optical members 8 receives optical signal.

The two optical members 8 are accommodated in the two grooves 105, respectively. The first lens 81 is received in the front portion 1050 of the groove 105, and the ferrule 82 is received in the back portion 1051 of the groove 105. The coil spring 9 is received in the back portion 1051 of the groove 105 and biases/pushes the optical member 8 forwardly. The flange 821 is larger than the front portion 1050 so as to prevent the optical member 8 sliding away the groove 105. The guiding post 822 extends into the passage 106 and capable of moving therein along the front-to-back direction. The fiber 65 passes through the corresponding fiber channel 2216.

The plug connector 1000 further comprises a cap member 80 mounted to the first insulative housing 1 to prevent the optical members 8 falling off therefrom. The cap member 80 includes a plate-like body segment 801 shielding the two grooves 105, four first engaging parts 802 extending upward from two lateral sides of the body segment 801 and inserted into the four first positioning holes 1053, respectively, and a second engaging part 803 extending upward from a back side of the body segment 801 and inserted into the second positioning hole 1054.

The plug connector 1000 is compatible with DiiVA (Digital Interactive Interface for Video & Audio) standard. Referring to FIGS. 1-2, within the cavity 104, along a left-to-right direction, there are thirteen terminals 212, 222 which are arranged in such manner: G-S-S-G-S-S-G-S-S-G-G-S-S. G represents grounding terminal, and S represent signal terminal There are three differential pairs consisted of six signal terminals located between grounding terminals. The differential pairs used for conveying video signals. And a pair of signal terminals disposed at the right side are used for audio signals.

Figure 4:
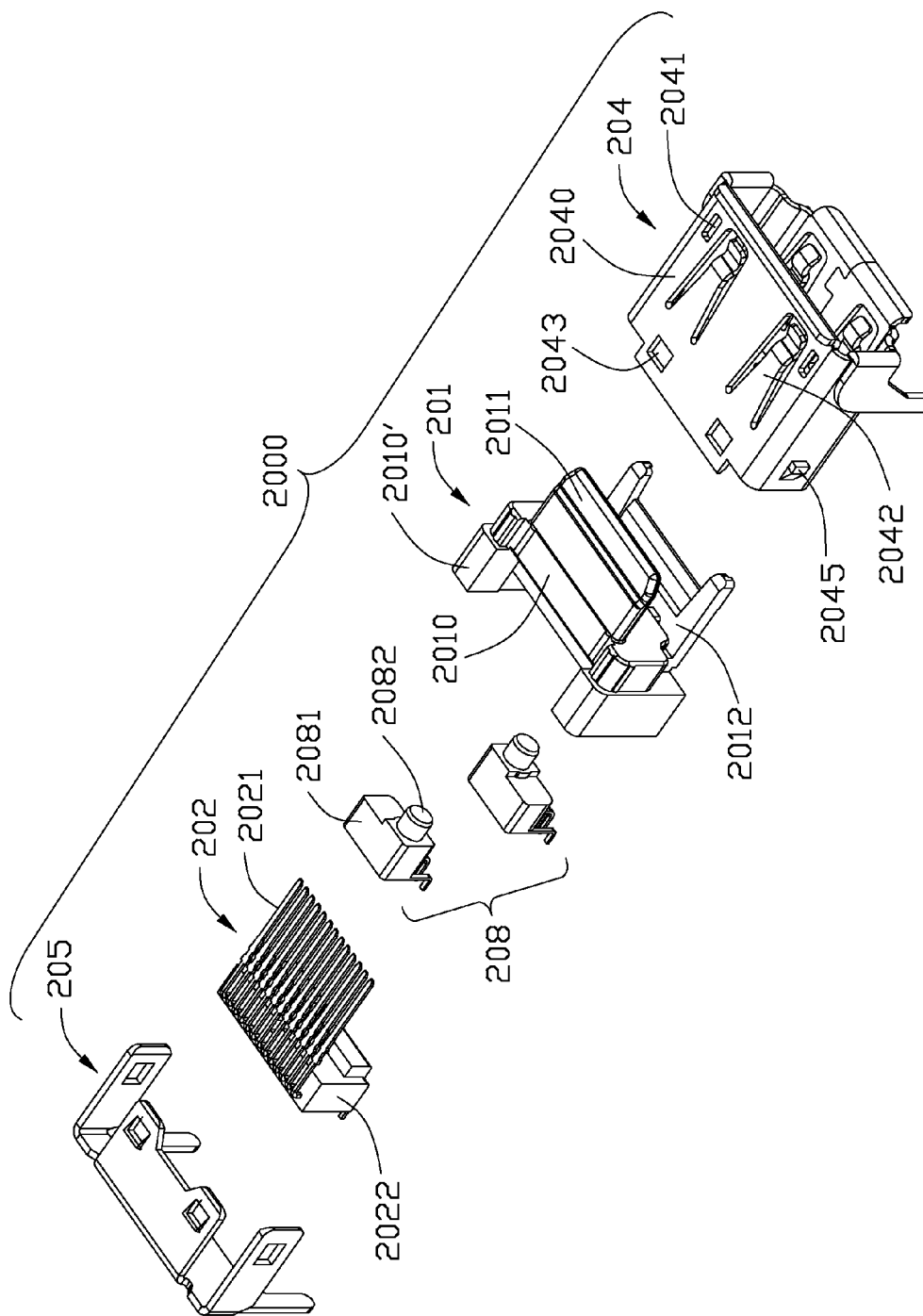
FIG. 4 is an exploded, perspective view of a receptacle connector of the connector assembly.
Figure 5:
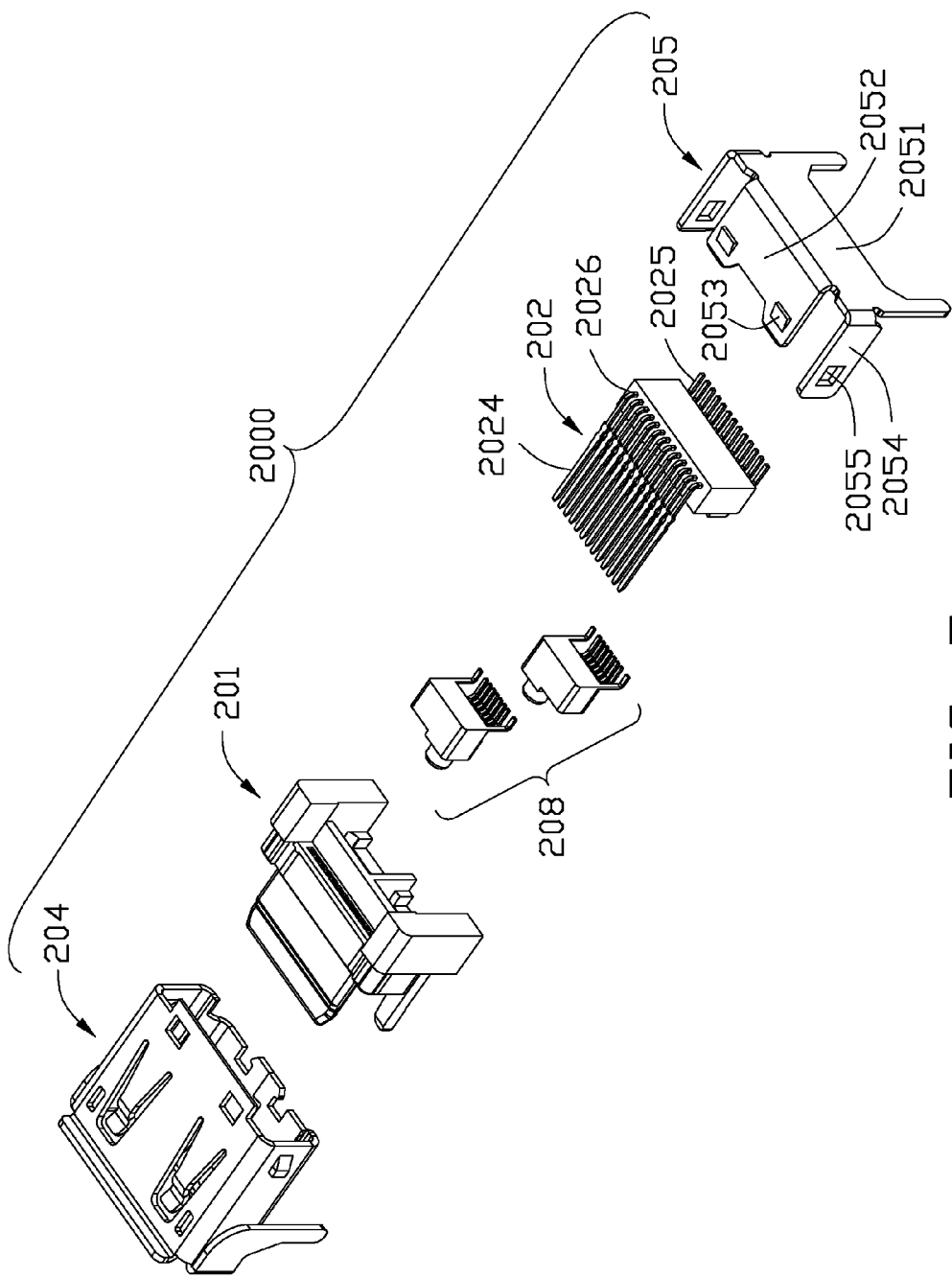
FIG. 5 is similar to FIG. 4, but viewed from other aspect.
Figure 6:
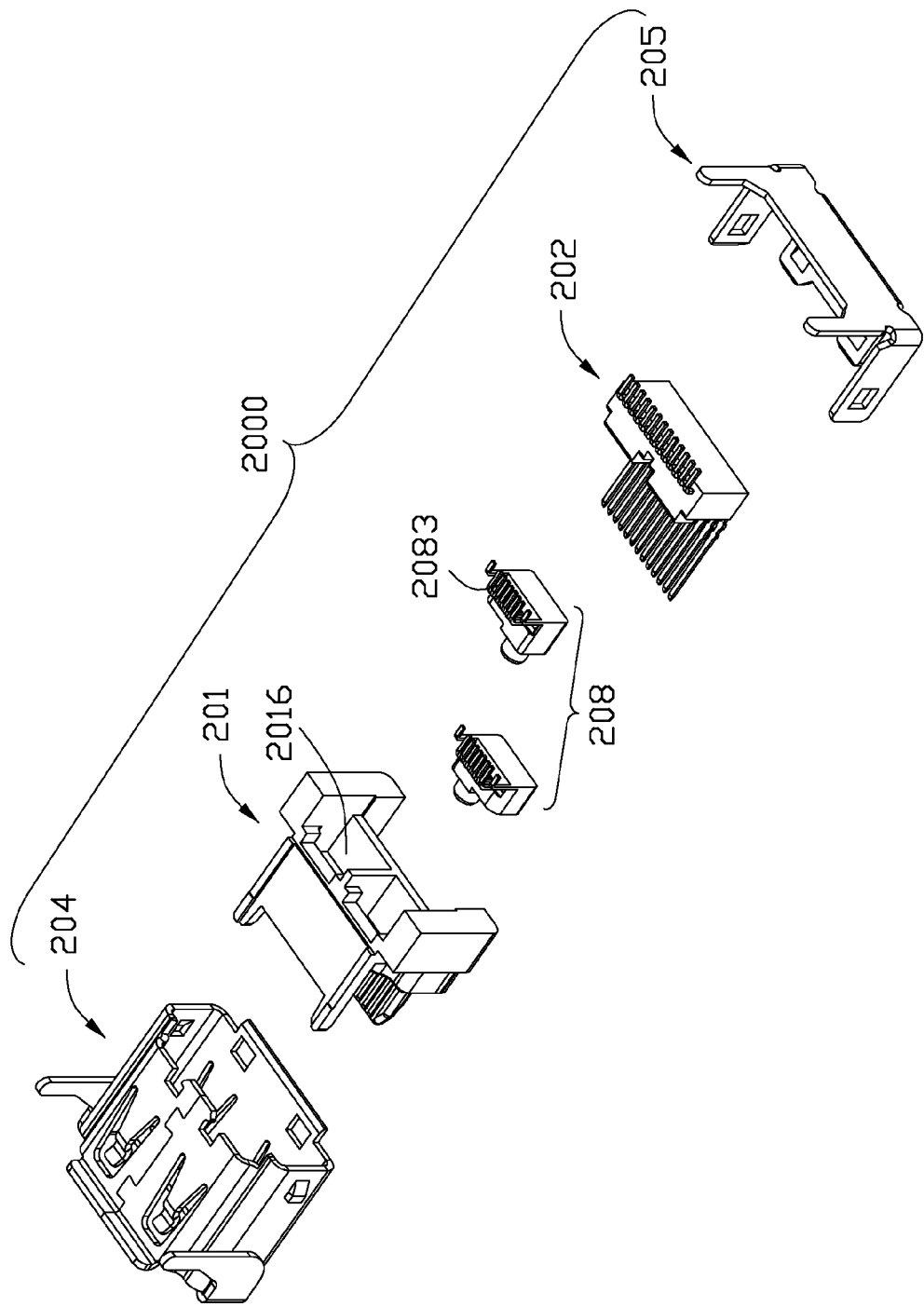
FIG. 6 is similar to FIG. 5, but viewed from other direction.

Referring to FIGS. 4-6, the receptacle connector 2000 comprises a second insulative housing 201, a contact module 202 supported by the second insulative housing 201, a second metallic shell 204 shielding the second insulative housing 201, a back cover 205 and two optical modules 208.

The second insulative housing 201 includes a base portion 2010, an upper tongue portion 2011 extending forwardly from an upper segment of the base portion 2010, a lower tongue portion 2012 extending forwardly from a lower segment of the base portion 2010. In addition, there are two attachments 2010' extending backwardly from lateral sides of the base portion 2010. There are two mounting cavities 2016 defined in the base portion 2010. The two mounting cavities 2016 are disposed in juxtaposed manner.

The contact module 202 includes a plurality of contacts 2021 arranged in one row and further combined with a corresponding contact seat 2022 by insert-molding process. Each contacts 2021 has a contacting segment 2024 extending along a horizontal direction, a retention segment 2026 extending downwardly from a back end of the contacting segment 2024 and inserted molded with the contact seat 2022, and a soldering segment 2025 extending backwardly from lower end of the retention segment 2026.

The contact module 202 is assembled to the second insulative housing 201 along a front-to-back direction, with the contacting segment 2024 passing through the base portion 2010 and disposed under and adjacent to the upper tongue portion 2011.

The second metallic shell 204 has a second frame 2040 for enclosing the second insulative housing 201. There are two pairs of spring tabs 2042 formed on a top side and a bottom side of the second frame 2040 and extending into an interior of the second frame 2040 respectively. There are two latching holes 2041 defined in the front of the top side of the second frame 2040. There are two first holes 2043 defined in a back segment of the top side of the second frame 2040. There are two first protrusions 2045 formed at back segments of two lateral sides of the second frame 2040.

The back cover 205 includes an inverted U-shaped main part 2051, a top shielding part 2052 horizontally extending forwardly from a top edge of the body part 2051 and two arms 2054 extending forwardly from lateral edges of the main part 2051. There are two second protrusions 2053 formed on a front segment of the top shielding part 2052. There is a second hole 2055 defined in a back segment of each arm 2054.

Each optical module 208 includes a main portion 2081, a second lens 2082 combined with the main portion 2081 and a plurality of pins 2083 extending downwardly from the main portion 2081. The two optical modules 208 are respectively assembled to the corresponding mounting cavity 2016. Furthermore, the two optical modules 208 are disposed between the two attachments 2010' and pressed by the contact seat 2022. One of the two optical modules 208 receives optical signal, and the other optical members 208 transmits optical signal, with regarding to the two optical members 8 of the plug connector. The soldering segment 2025 are located behind the pins 2023.

The back cover 205 is mounted to the second metallic shell 204 along a back-to-front direction so as to prevent the contact module 202 separating from the second insulative housing 201. The second hole 2055 of the arm 2054 is engaged with first protrusions 2045 of the second frame 2040. The second protrusion 2053 of the top shielding part 2052 is engaged with the first hole 2043 in the top side of the second frame 2040.

When the plug connector 1000 mates with the receptacle connector 2000, the optical member 8 aligning with and optically mating with the optical module 208 along the front-to-back direction, and optical signal transmitted via the first lens 81 and the second lens 2082. The terminal module 2 is electrically connected with the contact module 202, with the terminals 212, 222 mating with the contacts 2021 to transmit electrical signal. The hook 322 of the latching arm 32 locks into the latching hole 2041 in the second frame 2040, thus the plug connector 1000 are reliably engaged with the receptacle connector 2000. When detach the plug connector 1000 from the receptacle connector 2000, just press the deformable button 514 to actuate the tab 324 of the latching arm 32, and the latching arm 32 retreat into the slots 101. When the pressing force is withdrawn, the deformable button 514 restored to its original position, and the latching arms 32 also upwardly movement to their original place.

It will be understood that the invention may be embodied in other specific forms without departing from the spirit or central characteristics thereof The present examples and embodiments, therefore, are to be considered in all respects as illustrative and not restrictive, and the invention is not to be limited to the details given herein.

What is claimed is:

1. A connector assembly, comprising:
   a plug connector comprising:
   a first insulative housing;
   a terminal module supported by the first insulative housing, the terminal module including a plurality of terminals combined with an insulator;
   at least one optical member mounted to the first insulative housing;
   the optical member and the terminal module arranged at opposite sides of the first insulative housing;
   a receptacle connector comprising:
   a second insulative housing;
   a contact module supported by the second insulative housing, the contact module including a plurality of contacts combined with a contact seat;
   at least one optical module mounted to the second insulative housing; and
   wherein the contact module is adapted for mating with the terminal module transmitting electrical signal;
   wherein the optical member is adapted for mating with the optical module transmitting optical signal;
   wherein the first insulative housing has a top side and a bottom side, and the top side defines a cavity to accommodate the terminals and the bottom side defines a groove to accommodate the optical member;
   wherein the optical member is capable of moving in the groove.

2. The connector assembly as recited in claim 1, wherein the cavity is opened upwardly.

3. The connector assembly as recited in claim 1, wherein the second insulative housing includes a base portion, a tongue portion extending forwardly from the base portion.

4. The connector assembly as recited in claim 3, wherein the contacts have contacting segments arranged in a row and disposed under the tongue portion.

5. The connector assembly as recited in claim 4, wherein the contacting segments are located proximate to the upper tongue portion.

6. The connector assembly as recited in claim 3, wherein the base portion of the second insulative housing defines a mounting cavity to accommodate the optical module.

7. The connector assembly as recited in claim 3, wherein the contact module presses against the optical module.

8. The connector assembly as recited in claim 7, wherein there is a metallic shell shielding the second insulative housing.

9. The connector assembly as recited in claim 8, wherein there is a back cover mounted to the metallic shell along a back-to-front direction so as to prevent the contact module separating from the second insulative housing.

10. A connector assembly, comprising:
    a plug connector comprising:
    a first insulative housing;
    at least one terminal module supported by the first insulative housing, the terminal module including a plurality of terminals combined with an insulator;

two optical members mounted to the first insulative housing;

the optical members and the terminal module arranged at opposite sides of the first insulative housing;

a receptacle connector for electrically and optically coupled with the plug connector, comprising:

a second insulative housing;

at least one contact module supported by the second insulative housing, the contact module including a plurality of contacts combined with a contact seat; and two optical modules mounted to the second insulative housing;

wherein the two optical members are movable in first insulative housing, and the two optical modules are unmovable in the second insulative housing.

11. The connector assembly as recited in claim 10, wherein there are two grooves defined in the first insulative housing and the two optical members are respectively accommodated in the two grooves.

12. The connector assembly as recited in claim 11, wherein the two grooves are arranged in juxtaposed manner.

13. The connector assembly as recited in claim 10, wherein the second insulative housing having a base portion with two mounting cavities therein to accommodate the optical modules, respectively.

14. The connector assembly as recited in claim 13, wherein the two mounting cavities are disposed in juxtaposed manner.

15. A hybrid connector assembly comprising:

a receptacle connector for mounting to a printed circuit board, including:

a first insulative housing defining a mating cavity forwardly communicating with an exterior with a mating tongue therein;

a first metallic shell enclosing the first insulative housing;

a plurality of first electrical contacts disposed in the first housing with first contacting sections exposed upon the mating tongue and first mounting sections on a rear side of the first housing for mounting to the printed circuit board;

a first optical module associated within the first insulative housing and defining first front lens and a plurality of rear electrical terminals for mounting to the printed circuit board; wherein the first front lens is located behind the mating tongue and facing the mating cavity while the electrical terminals are located in front of the first mounting sections.

16. The hybrid connector assembly as claimed in claim 15, further including a plug connector, wherein said plug connector includes a second insulative housing enclosed in a second metallic shell with a plurality of second electrical contacts therein, a second optical module includes a second front lens back and forth moveable within the second housing, and a plurality of wires electrically connected to the corresponding second electrical contacts, respectively, and an optical fiber optically connected to the second front lens.

17. The hybrid connector assembly as claimed in claim 16, wherein the second electrical contacts are integrally formed within an terminal module with an insulator thereof, and said insulator defines a groove to receive the fiber therein.

* * * * *